Figure 1:
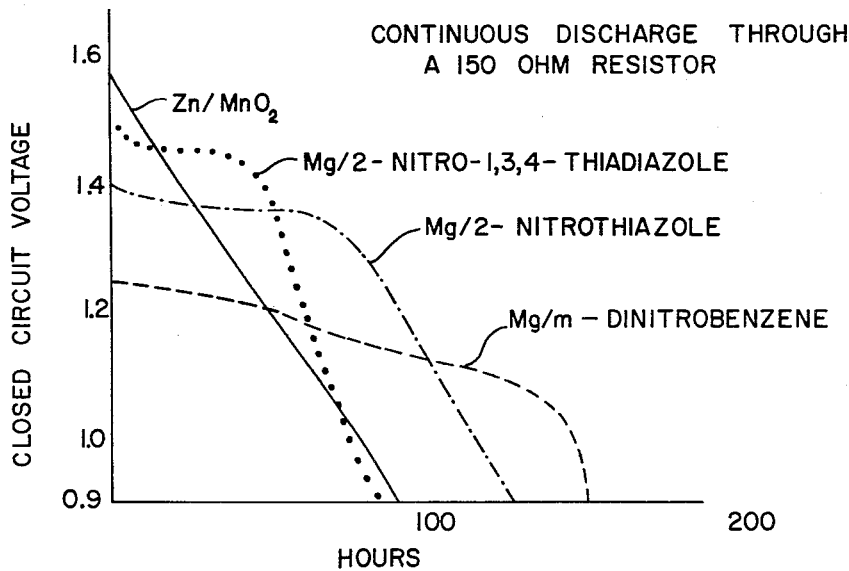

Oct. 6, 1964

R. A. COLEMAN ETAL 3,152,017

NITRO HETEROCYCLIC DERIVATIVES FOR
IMPROVED BATTERY COMPOSITIONS
Filed Aug. 17, 1960

INVENTORS
RALPH A. COLEMAN
RICHARD A. PARENT
JOHN D. VOORHIES

BY

ATTORNEY

United States Patent Office 3,152,017
Patented Oct. 6, 1964

3,152,017
NITRO HETEROCYCLIC DERIVATIVES FOR
IMPROVED BATTERY COMPOSITIONS
Ralph A. Coleman, Middlesex, and Richard A. Parent and John D. Voorhies, Somerville, N.J., assignors to American Cyanamid Company, New York, N.Y., a corporation of Maine
Filed Aug. 17, 1960, Ser. No. 50,268
8 Claims. (Cl. 136—137)

This invention relates to improved dry cells and to a new compound as a depolarizer.

Dry cells are extensively used and in general are composed of the following elements, an anode in the form of a cup of a metal high in the electro motive series such as zinc or magnesium or alloys thereof, a rod of carbon or other inert material to serve as a collector of electrons, a mixture of carbon and depolarizer, usually referred to as cathode mix or black mix, and an electrolyte which is generally a concentrated aqueous salt solution.

It is customary to use a depolarizer in all dry cells as this increases the life of the cell and its power output. It also aids in maintaining a satisfactory voltage under useful current loads. Depolarizers are oxidizers and for many decades the standard depolarizer for use in dry cells has been manganese dioxide. In order to obtain satisfactory distribution and conductivity the manganese dioxide is mixed intimately with finely divided carbon to produce the cathode mix surrounding the cathode itself.

The voltage of a dry cell, its life under various discharge rates, and maintenance of a minimum satisfactory voltage during a large part of its life are important factors. While inorganic depolarizers such as manganese dioxide are operative and have been standard for many decades they are by no means ideal. Extensive investigations have been carried out to develop better depolarizers and, as a result of these investigations, a number of organic compounds have been found which are superior to manganese dioxide. The best known, and in many respects one of the most effective, is m-dinitrobenzene. When this compound is used in a cathode mix, the voltage is somewhat lower than a fresh manganese dioxide depolarized cell but it stands up much better under heavy continuous use and a cell of greatly increased useful life results.

The present invention deals with two organic compounds which, as depolarizers, have never been used before and one of which is a new chemical compound. The two compounds are 2-nitrothiazole and 2-nitro-1,3,4-thiadiazole the latter being a new chemical compound. The two depolarizers of the present invention are far superior to manganese dioxide and provide a much higher voltage than m-dinitrobenzene with an adequately long life. This solves a problem which is presented by dry cells of relatively low voltage because they are not usable interchangeably with the manganese dioxide depolarized cells. The present invention provides for sufficiently high voltage, especially under heavy current drain such as occurs in flashlight use, with greatly improved life.

It is an advantage of the present invention that the new depolarizers may be introduced into the cathode mix in the same manner as other depolarizers in the past. In other words, there is not required a new technique of making dry cells, it is sufficient to replace the manganese dioxide or the m-nitrobenzene of the prior cells with either nitrothiazole or nitrothiadiazole. The new depolarizers are easily handled and present no manufacturing problem.

The markedly enhanced cathodic potential obtained with the depolarizers of the present invention may be utilized in several ways. If maximum voltage is desired, a dry cell is prepared with a magnesium anode; on the other hand, it is possible to use zinc anodes although the voltage will not be quite as high. This was not possible with m-dinitrobenzene because with zinc anodes the voltage of the cell was too low for many uses.

Figure 2:
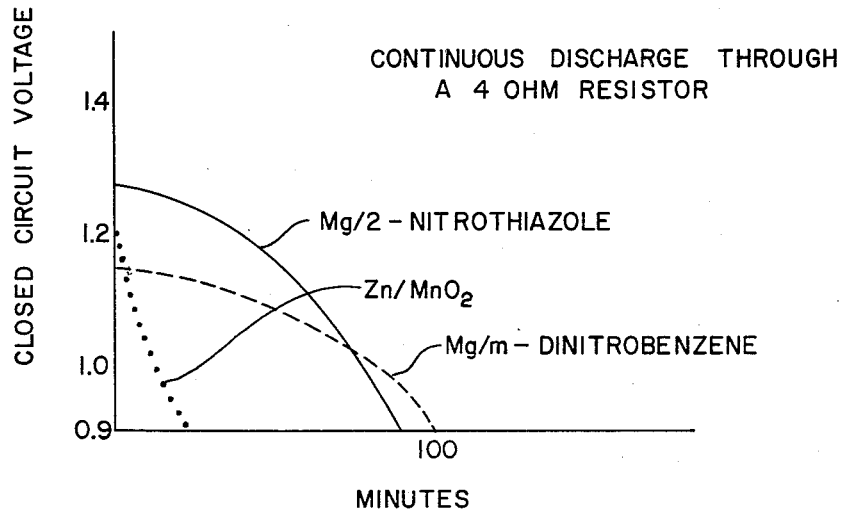

The invention will be described in greater detail in connection with the drawings in which:

FIG. 1 is a series of curves of an "AA" size cell discharge through a 150 ohm resistor, and FIG. 2 is a similar set of curves of discharge through a 4 ohm resistor.

The invention will also be described in greater detail in conjunction with the following specific examples, the parts being by weight unless otherwise specified.

EXAMPLE 1

A solution of one part of 2-aminothiazole dissolved in 6 parts of 2 N hydrochloric acid was gradually added with vigorous stirring to 2 parts of sodium nitrite, 1 part of sodium cobaltinitrite, and 0.5 part of a copper (I, II) sulfite in 15 parts of water. The copper (I, II) sulfite was prepared by mixing a water solution of 1 part of crystallized sodium sulfite with a solution of 1 part of copper sulfate, filtering off the green-brown precipitate and drying.

On mixing the reagents nitrogen was liberated and after gas evolution was completed the reaction mixture was extracted with chloroform, methylene chloride, or ether until extraction was complete. The combined extracts were dried with anhydrous sodium sulfate and the solvent was removed by distillation until nitrothiazole was obtained.

EXAMPLE 2

The procedure of Example 1 was repeated replacing the 2-aminothiazole by 2-amino-1,3,4-thiadiazole. The product, which is 2-nitro-thiadiazole, was obtained as a solid having a melting point from 84–85° C.

EXAMPLE 3

Small AA batteries were made up using 5 to 5.5 g. of a cathode mixture containing 3 grams of 2 M magnesium bromide as an electrolyte with 0.06 g. of barium chromate inhibitor. The cathode mixture also contained about 2 g. of a mixture of organic compound depolarizer and carbon black. A number of mixtures were prepared with the organic depolarizers and two different carbon formulations. In the one case, all of the carbon was low surface area carbon, commercially known as acetylene black and having about 70 sq. meters of surface area per gram. The second carbon formulation was a mixture of acetylene black and high surface area carbon black known as channel black and having an average surface area of 950 m.²/g. In each case a magnesium can or cup was used as an anode. The proportions of compounds in different dry cells are given in the following table.

Table 1

| Depolarizer | Compound | Acetylene Black | Channel Black |
|---|---|---|---|
| m-Dinitrobenzene (Fig. 1) | 0.63 | 0.63 | 0.63 |
| m-Dinitrobenzene (Fig. 2) | .63 | 1.28 | |
| 2-Nitrothiazole (Fig. 1) | 1.30 | .41 | .60 |
| 2-Nitrothiazole (Fig. 2) | .70 | 1.4 | |
| 2-Nitro-1,3,4-Thiadiazole (Fig. 1) | .84 | .47 | .93 |

The dry cells were then tested conventionally by continuous discharge, in the one case through a 150 ohm resistance, and in the other case, through a 4 ohm resistance. In each case, a standard manganese dioxide depolarized cell was also tested for comparison.

FIG. 1 shows the results of the discharge test through a 150 ohm resistor. It will be seen that the standard dry cell had a rapid voltage drop and a limited life. The depolarizers of the present invention gave a much flatter voltage curve. It will be noted that with a higher sustained voltage much greater power was available with the new depolarizers of the present invention. The useful cut off point is taken at 0.9 volt. The nitrothiazole although not having quite as high an initial voltage showed a much flatter voltage curve and a considerably greater total energy before the voltage dropped below the 0.9 point. It will also be noted that in comparison with m-dinitrobenzene, the voltage is much higher initially although the latter showed a long life down to 0.9 volt. As far as average power output is concerned, the nitrothiazole is greater than that of the standard manganese dioxide depolarized dry cell.

FIG. 2 shows an even more dramatic result. This corresponds to the heavy drain of ordinary flashlight use. Here the standard manganese dioxide depolarized dry cell shows up very poorly with a very short life. Both the nitrothiazole and the m-dinitrobenzene cells showed much more satisfactory lifes, but throughout the greater part of the discharge the voltage of the nitrothiazole depolarized cells was markedly higher. As a result, the total energy is somewhat higher than with m-dinitrobenzene. Of course, the higher voltage throughout most of the life is of great importance as it permits a brighter flashlight for a longer time.

If a somewhat higher voltage cut-off of volts is taken (a specification often encountered in actual use), the life of the nitrothiazole depolarized cells and m-dinitrobenzene depolarized cells are nearly the same at both the above described discharge rates shown in FIGS. 1 and 2, but the former has a higher voltage and shows a greater total energy.

We claim:

1. A dry cell comprising in combination an anode of a highly electro positive metal, and a cathode composition comprising a mixture of carbon and a depolarizer compound selected from the group consisting of 2-nitrothiazole and 2-nitro-1,3,4-thiadiazole.

2. A dry cell according to claim 1 in which the anode is magnesium.

3. A dry cell comprising in combination an anode of highly electro positive metal, and a cathode composition comprising a mixture of carbon and 2-nitrothiazole.

4. A dry cell according to claim 3 in which the anode is magnesium.

5. A dry cell according to claim 3 in which the carbon is a mixture of a low surface carbon and a high surface carbon.

6. A dry cell comprising an anode of a highly electro positive metal, and a cathode composition comprising a mixture of carbon and 2-nitro-1,3,4-thiadiazole.

7. A dry cell according to claim 6 in which the anode is magnesium.

8. A dry cell according to claim 7 in which the carbon is a mixture of high surface carbon and low surface carbon.

References Cited in the file of this patent

UNITED STATES PATENTS

| | | |
|---|---|---|
| 2,827,457 | Slack et al. | Mar. 18, 1958 |
| 2,874,079 | Lozier et al. | Feb. 17, 1959 |
| 2,880,122 | Morehouse et al. | Mar. 31, 1959 |
| 2,921,066 | Worffel et al. | Jan. 12, 1960 |